April 20, 1954 W. T. READ, JR., ET AL 2,676,197
GLASS TO METAL SEAL FOR DEEP-SEA ELECTRIC CABLE
Filed Nov. 17, 1950 2 Sheets-Sheet 1
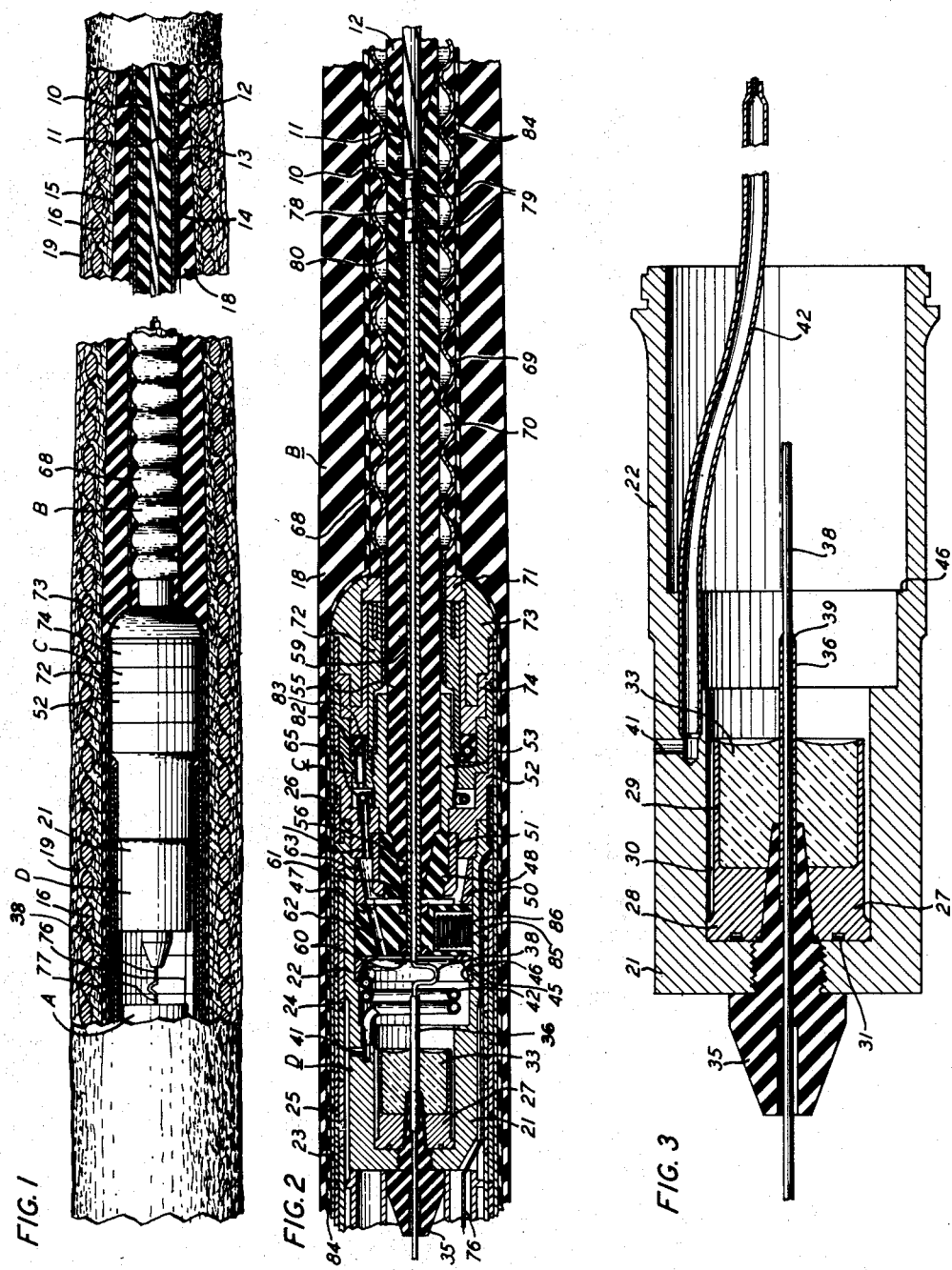
INVENTORS: W. T. READ, JR.
V. L. RONCI
BY
ATTORNEY April 20, 1954  W. T. READ, JR., ET AL  2,676,197
GLASS TO METAL SEAL FOR DEEP-SEA ELECTRIC CABLE
Filed Nov. 17, 1950  2 Sheets-Sheet 2

INVENTORS: W. T. READ, JR.
V. L. RONCI
BY
ATTORNEY

Patented Apr. 20, 1954

2,676,197

UNITED STATES PATENT OFFICE 2,676,197

GLASS TO METAL SEAL FOR DEEP-SEA ELECTRIC CABLE

William T. Read, Jr., Summit, N. J., and Victor L. Ronci, Zionsville, Pa., assignors to Bell Telephone Laboratories, Incorporated, New York, N. Y., a corporation of New York Application November 17, 1950, Serial No. 196,106

6 Claims. (Cl. 174—23)

This invention relates to glass-to-metal seals for apparatus subject to very high pressures and particularly to such seals for deep-sea submarine cables.

In some submarine cables, which may be employed for the transmission of telephone signals, housings for electrical apparatus, such as repeaters, are placed at intervals along the length of the cable. As the cable is expected to remain in service for a long period of years, every precaution must be taken to protect the cable against any possible injury or failure that might occur. Because of the very large pressures that a deep-sea submarine cable is subject to over these many years, the cable must be designed to withstand the ingress of water because of a failure at some point. A plurality of water resistant and water impervious means are therefore provided to protect the electrical housings and to prevent water vapors penetrating the housings or the full or partial sea pressure bearing against the repeater elements. To this purpose various end seals and glands are employed between the main portion of the cable and the electrical housing, forming a transition portion of cable. However it is still possible that even these seals will fail under the constant pressure over a large number of years and that water vapor or insulating compound under the full or partial sea pressure will bear against the end seal through which the center conductor of the cable enters the apparatus housing.

It is one object of this invention to provide an improved deep-sea glass-to-metal seal.

It is another object of this invention to provide an improved deep-sea lead-in seal in a submarine cable between the apparatus housing and the remainder of the cable, which seal will be able to withstand the very large deep-sea pressures for a long period of time.

A further object of this invention is to extend the life of deep-sea submarine cables by preventing water vapors or insulating compound under sea pressure from entering the electrical apparatus housing.

These and other objects are accomplished in a glass-to-metal seal in accordance with this invention wherein the glass is maintained under substantially pure hydrostatic compression. As glass has enormous strength when under pure compressive stress but is comparatively weak under tensile stresses or shear stresses, this effects a tremendous gain in the pressure the seal can withstand without failure. Failure of glass-to-metal seals under such high pressures may result from the glass separating from the metal in the form of lamina cracks, a rupture of the metal-to-glass bond due to tensile stresses, or cracks developing in the glass due to shear stresses.

In one specific embodiment of this invention, the glass-to-metal seal comprises an end plug in turn sealed to other parts of the cable, the end plug having secured thereto a metallic cup having thin side walls and a glass block sealed therein. A sealing sleeve extends through the glass block into an aperture formed at the base of the block, the aperture extending through the base of the cup and the base of the end plug. A lead is placed within the sleeve and secured thereto to form an impervious seal. A bushing surrounds the inner end of the lead, extending into the aperture formed in the base of the glass block, cup and plug.

The cup in which the glass block is sealed has a flat base secured to the base of the end plug. The thin side walls of the cup are adjacent but removed from the side walls of the end plug. The glass is thus under compression along both the open face of the glass block and along its sides where the glass is sealed to the thin metal walls of the cup. Tensile or shear stress along the surface of the glass or particularly along the bond between the glass and the metal is thus avoided and the seal placed substantially under pure compression.

It is one feature of this invention that space be provided between the side walls of the member in which the glass-to-metal seal is to be supported and the sides of the glass themselves so that the glass is under substantially pure compression.

It is a further feature of this invention that a glass block be sealed in a metal member having thin walls surrounding the glass block, the metal member in turn being secured to or integral with the base metallic member in which the glass seal is to be supported, space being left around the thin walls surrounding the glass block so that hydrostatic pressure may bear on the sides of the glass sealed to the metal as well as on the end of the glass.

It is a still further feature of this invention that a metal-to-glass seal as described in the preceding paragraph have a lead conductor extending through the glass block and sealed thereto, the lead comprising one conductor of a deep-sea submarine cable.

A complete understanding of this invention and of the various features thereof may be gained from consideration of the following detailed description and the accompanying drawings, in which:

Fig. 1 is a view, partly in section, of a submarine cable in which this invention may be employed, showing the cable seals which are between the apparatus housing and the cable proper;

Fig. 2 is a detailed sectional view of the end seals and connections to the apparatus housing, showing a glass-to-metal seal illustrative of one embodiment of this invention;

Fig. 3 is an enlarged sectional view of the glass seal assembly shown in Fig. 2;

Figure 4:
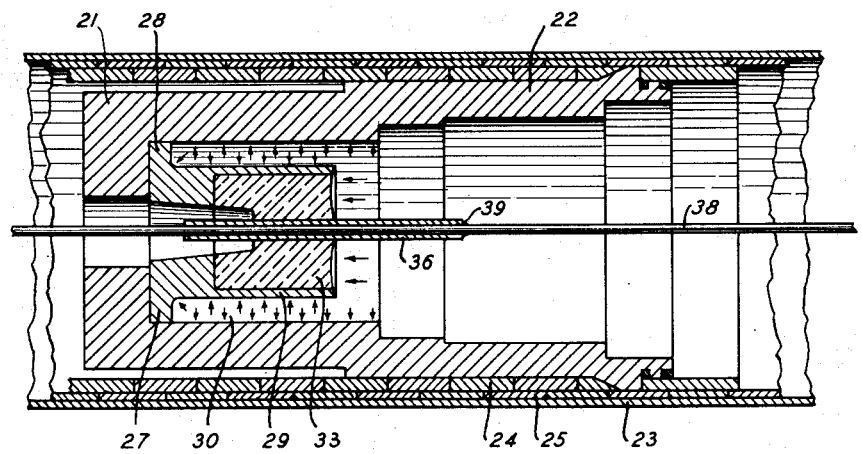
Fig. 4 is a schematic representation of the action of hydrostatic pressure on the seal shown in Fig. 2 showing the substantially pure compressive forces applied, the spacing between the walls of the cup and the end plug being shown greatly enlarged.

Referring now to Fig. 1, the submarine cable end is connected to a repeater housing A by a transitional section of cable, a lead assembly B, a rubber seal assembly C, and a glass seal assembly D, shown in more detail in the other figures. The cable may advantageously comprise a center conductor 10 as of copper, around which are wound three surround tapes 11, which may be also of copper. A polyethylene core insulation 12 encompasses the center conductor. Six return tapes 13, also of copper, are wound around the polyethylene insulator 12 and provide an electrical return circuit for the cable and for the electrical apparatus in the housing A. Another tape or thin foil strip 14 of copper is advantageously wound around the return tapes 13 when the cable is expected to be laid in warm tropical waters as additional protection against a water animal prevalent in those waters. In the cable proper between repeater housings and removed from the housing a thin fibre glass or rayon tape encompasses the tape 14 and together with cutched jute 15 provides a bedding for the armor which comprises steel wires 16 wound around the cable. Fig. 1 shows a transitional portion of cable in which the outer diameter is gradually built up from the small diameter of the cable to the large diameter of the housing. This taper is provided by several layers of fibre glass tape 18 surrounding the tape 14. Tarred jute 19 overlies the armor wires 16 and encompasses the whole cable.

Referring now to Figs. 2 and 3, the glass seal, which is the innermost seal and protecting means for the electrical apparatus within the housing to prevent water vapor or insulating compound entering the housing, comprises a metal end plug 21 having a long side sleeve portion 22 which is brazed near its ends to a copper sheath or tube 23, the connection advantageously being made by a copper ring 26 intermediate the end of the portion 22 and the copper tube 23. A plurality of inner steel rings 24 encompasses the glass seal and the housing. A second layer of inner steel rings 25 offset from the rings 24 encompasses the first rings and is in turn totally surrounded by the copper tube 23. A cup member 27 having a base portion 28 and thin walls 29 which are separated from the plug side portion 22 by the distance 30 is secured to the base of the plug 21 as by a solder ring 31. A glass cylinder 33 is sealed in the cup 27. The inner end of the glass cylinder 33, the cup 27, and the plug 21 are provided with apertures through which an end bushing 35 extends, a sealing sleeve 36 extending through the bushing and through the center of the glass cylinder 33, to which it is sealed. The central lead 38, which may be of nickel, extends through the sealing sleeve 36 and is secured thereto, as by soft solder 39, thereby sealing the lead in the sleeve.

An aperture 41 is provided in the side portion 22 of the end plug 21 to which a tubulation 42 is attached to allow a nitrogen flushing of the housing A after completion of the glass seal, nitrogen under a pressure of two pounds per square inch being advantageously left in the housing. The end of the tubulation is welded closed and the tubulation coiled, as best seen in Fig. 2. The sealing sleeve 36, cup 28, and end plug 21 are advantageously of an iron-nickel-cobalt alloy known as "Kovar," while the cylindrical glass block 33 is advantageously of a glass whose coefficient of expansion matches that of "Kovar," such as that known commercially as Corning 704, and the bushing 35 of a Lucite plastic, such as methylmethacrylate, or a ceramic.

A support member 45, which may be of brass, bears against an edge 46 on the side portion 22 of the end plug 21 and provides backing for a mechanical support 47. A plurality of metallic cup and sleeve members 50, 51, 52, and 53 are threaded or brazed together and to the side portions 22 of the end plug 21 and to the outer copper tubing 23 to provide mechanical backing for the rubber seal portion C. Member 51 provides a backing for a mechanical support 48. The supports 47 and 48 may be of nylon and hold the rubber seal, which is the main sea pressure seal. The seal itself comprises an insulating sleeve of soft rubber 55 having a conical end portion 56 bearing against the outer nylon support member 48. A brass conductor sleeve 59 extends through the rubber sleeve 55 and is secured thereto as by a chemical vulcanization bond. The member 53 is also secured to the sleeve 55 by a vulcanization bond. The conductor sleeve 59 also extends through both nylon supports 47 and 48 and is secured to two end nuts 60 and 61 in the support 47, as by being in threaded engagement therewith. The central conductor 38 extends through the brass conductor sleeve 59 and is brazed to it and to the end of the cable conductor 10, as described more fully below with reference to the lead assembly B.

Apertures 62, 63, and 64 are provided in the inner nylon support 47 and the sleeve members 51 and 52 respectively, and a tubulation 65 is attached to the sleeve member 52 to allow the injection of an insulating fluid, such as "Vistac," into the spaces surrounding the glass metal seal D between it and the rubber seal portion C, and between the sleeve members and the inner nylon member of the rubber seal. After the injection of the fluid, the tubulation 65 is sealed off, as by welding and bent over, the insulating fluid being at a pressure of fifty pounds per square inch. The insulating fluid has been omitted from Fig. 2 to prevent an overcrowding of elements in the drawing.

The inner end of the lead assembly B, whose outer end is secured to the transitional section of the cable, fits into the rubber seal assembly C. The lead assembly B comprises a copper tube 68 whose outer end is cylindrical and is electrically connected to the return tapes 13 of the cable and the transitional section. The return tapes 13 are advantageously silver soldered to the outside of the cylindrical end of tube 68. The main portion of the copper tube 68 comprises a series of corrugations 69, the polyethylene insulator 12 surrounding the central conductor 10 of the cable and the soft rubber insulator 55 of the rubber seal assembly both being encompassed by the main portion of the copper tube 68. The polyethylene insulator 10 is sealed to the soft rubber insulator 55 by means of a plurality of splicing compounds of varying composition including the soft rubber and the polyethylene. The space 70 between the corrugations 39 and the polyethylene and soft rubber insulators 12 and 55 is filled with an insulating compound, such as "Vistac," not shown on the drawing for clarity.

The innermost end of the copper tube 68 is straight and secured, as by brazing, to a metal sleeve 72, which may be of brass, and which in turn is secured to a sleeve member 74 brazed to the copper sheath or tube 23. The sleeve 72 is advantageously threaded to the metallic sleeve 53 of the rubber seal assembly. A sleeve member 73 is secured, as by being in threaded engagement, to the member 74 and a sleeve member 71 also surrounds the copper tube 68 within the member 73. Electrical connection between the return tapes 13 and the return circuit in the housing A is completed through the copper tube 68 to the copper tube 23 and by means of a wire 76 connected to the tube 23 to the housing A. The central conductor lead 38 extending through the bushing 35 is also secured to a lead 77 extending out of the apparatus within the housing A.

The conductor sleeve 59 and central conductor 38 are connected to the central cable conductor 10 and the surround tapes 11 in the lead assembly portion B, by an interposed copper stub 78 and two nickel sleeves 79 being silver brazed to the central conductor 10, the sleeve 59 and the copper stub 78. A plurality of continuity wires 80 surround the conductors, the stub, and the points of juncture, the ends of the wires 80 being secured as by soft solder to the surround tapes 11 and the sleeve 59, the soft solder also advantageously wetting the central wire 10.

A tubulation 82, similar to tubulation 65 is supported by insulator 83 and serves to inject an insulating fluid between the rubber seal and lead assemblies.

The transitional cable section, lead assembly B, rubber seal assembly C, glass seal assembly D, and housing A have wound around them alternate layers of glass tape 18 and asphalt paint, the layers being wound so as to build up into an even taper from the cable end to the housing A. A corrosion protection for example of a gutta-percha and asphalt paint 84 is painted onto the outer copper sleeve 23 and the copper sleeve 68 thus surrounding the housing A and the seal and lead assemblies B and C before the glass tapes are wound on. Two layers of armor steel wires 16 may advantageously be applied over the glass tape on the housing A, the tape acting as the armor bedding. The wires are wound with opposite lay to prevent twisting of the housing A. Tarred jute 19 is then wound over the armor wires.

In normal employment the rubber seal assembly is expected to withstand the full sea pressure, there being only a nominal pressure, such as fifty pounds per square inch, on the glass seal. This pressure is maintained by a pressure limiter 85 placed in an aperture 86 in the nylon support member 47. The limiter comprises a corrugated metal partially filled with "Vistac" and partially with air. It is intended that this will be the only air entrapped in these seal assemblies.

When the cable is laid, the rubber seal assembly C will sustain the sea pressure and prevent it from forcing the insulating compound or vapor into the housing A. However on failure of this seal the full sea pressure will then be applied to the glass seal assembly D, the pressure limiter collapsing under this greatly increased pressure. Referring now to Fig. 4 there is shown a representation of the hydrostatic pressure on the glass seal at this time, the various spacings being enlarged to aid in observing the pressures. As is apparent from the directions of the arrows which indicate the hydrostatic pressure the seal is under pure compression along the upper end of the glass block and along its walls. The area of the seal between the glass block 33 and the thin walls 29 of the cup 27 together with the compressive forces pressing the thin walls into the glass, due to the groove or space 30 being provided between the thin walls of the cup and the side portion 22 of the end plug member, prevent shear forces developing at the point of sealing and rupturing the seal. Thus the bond between the glass and the thin walls is of sufficient area to allow the metal to withstand the high hydrostatic pressure without deformation.

The cup 27 and the thin walls 29 also enable easy and convenient processing without the introduction of deleterious stresses as the glass may be molded in the cup 27, the thin walls 29 being sufficiently thin to allow it to follow the thermal characteristics of the glass, without itself introducing any stresses in the bond with the glass.

A sufficient bond with the conductor sleeve 36 is provided to resist the shear stresses due to end pressure on this sleeve by the thickness of the glass block 33. Further a good non-leakage path between the sleeve 36 and the cup 27, which is electrically connected to the return circuit, is maintained by the length of the metal-to-glass bond.

In actual use it is not anticipated that the sea pressure on the glass seal assembly D would exceed 7,000 pounds per square inch, but because of the extreme care and exceedingly high safety factors that must be employed in the construction of a cable that is to be permanently laid on an ocean floor at great expense and with little anticipation of opportunity to repair it for many years and then only at great expense, the glass seal assembly must be able to withstand much higher pressures. Various specific embodiments of this invention as illustrated in Figs. 2 and 3 have been constructed and have withstood pressures of the order of 35,000 pounds per square inch without failure.

A glass seal assembly in accordance with this invention may therefore be expected to successfully withstand the deep-sea pressures to which it may be subjected after failure of the other water and pressure resistant means, thereby adding many years of life to the submarine cable.

Figure 5:
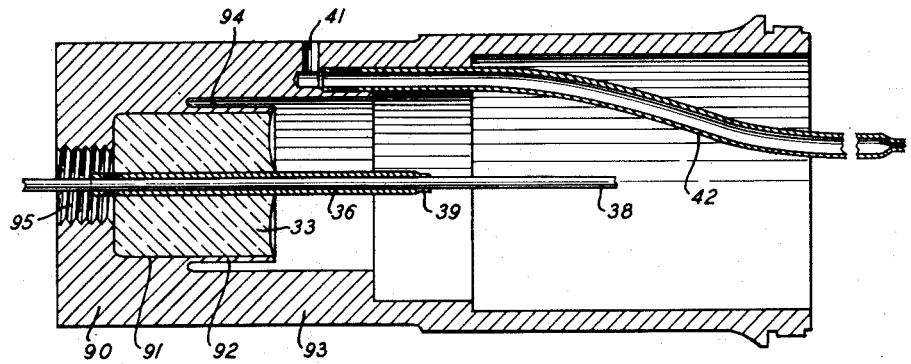
Fig. 5 is a sectional view of a glass-to-metal seal illustrative of another embodiment of this invention.

Referring now to Fig. 5, there is shown another illustrative embodiment of this invention in which the end plug 90 has integrally formed therein a cup-shaped recess or aperture 91 with side portions 92 separated from the side portions 93 of the plug by a groove or space 94. The glass block 33 is sealed in the aperture 91, the conductor sleeve 36 extending through the block 33 and into a threaded aperture 95 in the base of the plug 90.

A threaded bushing may advantageously be placed in the aperture 95.

It is to be understood that the above-described arrangements are illustrative of the application of the principles of this invention. Numerous other arrangements may be devised by those skilled in the art without departing from the spirit and scope of the invention.

What is claimed is:

1. A deep-sea lead-in vapor seal capable of withstanding hydrostatic pressures of many thousands of pounds per square inch comprising a metallic body having a base and a cylindrical side portion, cup-shaped means associated with said base within said cylindrical side portion and having thin side walls closely adjacent said cylindrical side portions but removed therefrom, a cylindrical glass block within said cup-shaped means and sealed thereto, said side walls being thin enough to flex with said glass block when said block is subjected to stress, a metallic sealing sleeve extending through said aperture and sealed to said block, and a lead-in wire in said sealing sleeve and secured thereto to form an impervious seal.

2. A deep-sea lead-in vapor seal capable of withstanding hydrostatic pressures of many thousands of pounds per square inch, in accordance with claim 1, wherein said cup-shaped means associated with said base within said cylindrical side portion and having thin side walls closely adjacent said cylindrical side portions but removed therefrom comprises a cup-shaped aperture in said base and a groove in said base intermediate said cup-shaped aperture and said side wall portions.

3. A deep-sea lead-in vapor seal capable of withstanding hydrostatic pressures of many thousands of pounds per square inch comprising an end plug having end and side portions, a sealing cup having a base secured to said end portion of said plug and thin walls closely adjacent and parallel to said side portions but separated therefrom, a cylindrical glass block sealed in said cup and having a central aperture therein, said side portions of said cup being thin enough to flex with said glass block when said block is subjected to stress, a metallic sealing sleeve extending through said aperture and sealed to said block, and a lead-in wire in said sleeve and secured thereto to form an impervious seal.

4. A deep-sea lead-in vapor seal capable of withstanding hydrostatic pressures of many thousands of pounds per square inch comprising an end plug having end and side portions, a cylindrical sealing cup having a base portion secured to said plug end portion and thin walls closely adjacent said plug side portions but removed therefrom, a solid glass cylinder sealed in said cup, said thin walls being thin enough to flex with said glass cylinder when said glass cylinder is subjected to stress, said plug end, cup base, and the portion of said glass cylinder adjacent said base having cooperating apertures and said glass cylinder also having a central aperture extending through said cylinder and communicating with said first-mentioned apertures, a metallic sealing sleeve extending through said central aperture and sealed to said glass, an insulating bushing surrounding the end of said sealing sleeve in said first-mentioned apertures and filling said first-mentioned apertures, fluid insulating compound between said side and wall portions and surrounding the other end of said sealing sleeve, and a lead-in wire extending through said sleeve and sealed thereto.

5. A deep-sea lead-in vapor seal for a submarine cable comprising an end plug having end and side portions, a cylindrical sealing cup having a base portion secured to said plug end portion and thin walls adjacent said plug side portions but removed therefrom, a solid glass cylinder sealed in said cup, said plug end, cup base and the portion of said glass cylinder adjacent said base having cooperating apertures, said glass cylinder having also a central aperture extending through said cylinder and communicating with said first-mentioned apertures, a metallic sealing sleeve extending through said central aperture and sealed to said glass cylinder, an insulating bushing surrounding the end of said sealing sleeve in said first-mentioned apertures and filling said apertures, and a lead-in wire in said sleeve and soldered thereto to form an impervious seal.

6. A deep-sea lead-in vapor seal for a submarine cable comprising an end plug having end and side portions, a cylindrical sealing cup having a base portion secured to said plug end portion and partially to said plug side portion, said cup also having thin walls, said thin walls and the remainder of said base portion being parallel and adjacent to said side portions but separated therefrom, a solid glass block sealed in said cup, said plug end, cup base, and the portion of said glass block adjacent said base having cooperating apertures, said glass block also having a central aperture extending through said block and communicating with said first-mentioned apertures, a metallic sealing sleeve extending through said central aperture and sealed in said glass, an insulating bushing surrounding the end of said sealing sleeve in said first-mentioned apertures and filling said apertures, a fluid insulating compound between said sealing cup and said plug side portions and surrounding the other end of said sealing sleeve, and a lead-in wire in said sleeve and sealed thereto.

References Cited in the file of this patent

UNITED STATES PATENTS

| Number | Name | Date |
|---|---|---|
| 2,079,354 | Knowles | May 4, 1937 |
| 2,245,394 | Francis et al. | June 10, 1941 |
| 2,261,613 | Bishop | Nov. 4, 1941 |
| 2,307,561 | Bailey | Jan. 5, 1943 |